(12) United States Patent
Slaten

(10) Patent No.: US 8,906,334 B2
(45) Date of Patent: Dec. 9, 2014

(54) HIGH EFFICIENCY REACTOR AND PROCESS

(75) Inventor: Colin S. Slaten, Orange, TX (US)

(73) Assignee: INVISTA North America S.a r.l., Wilmington, DE (US)

( * ) Notice: Subject to any disclaimer, the term of this patent is extended or adjusted under 35 U.S.C. 154(b) by 1975 days.

(21) Appl. No.: 12/152,485

(22) Filed: May 14, 2008

(65) Prior Publication Data

US 2012/0141345 A1 Jun. 7, 2012

Related U.S. Application Data

(60) Provisional application No. 60/917,706, filed on May 14, 2007.

(51) Int. Cl.
*C01C 3/02* (2006.01)
*B01J 8/02* (2006.01)
*B01J 8/04* (2006.01)
*B01J 12/00* (2006.01)
*F28D 15/02* (2006.01)
*F28F 19/02* (2006.01)
*B01J 23/40* (2006.01)
*B01J 37/02* (2006.01)

(52) U.S. Cl.
CPC .............. *C01C 3/0229* (2013.01); *C01C 3/02* (2013.01); *B01J 8/0285* (2013.01); *B01J 8/0496* (2013.01); *B01J 12/007* (2013.01); *B01J 23/40* (2013.01); *B01J 37/0215* (2013.01); *B01J 2208/00132* (2013.01); *B01J 2208/00274* (2013.01); *B01J 2208/0053* (2013.01); *F28D 15/02* (2013.01); *F28F 19/02* (2013.01); *Y02C 20/20* (2013.01)
USPC ............................ 423/372; 423/375; 423/376

(58) Field of Classification Search
None
See application file for complete search history.

(56) References Cited

U.S. PATENT DOCUMENTS

| 1,873,873 A | 8/1932 | Downs |
| 1,873,876 A | 8/1932 | Downs |
| 1,957,949 A | 5/1934 | Andrussow et al. |
| 2,768,132 A | 10/1956 | Halliwell |
| 2,768,876 A | 10/1956 | Wagner |
| 3,370,082 A | 2/1968 | Eisfeld et al. |

(Continued)

FOREIGN PATENT DOCUMENTS

| CN | 1113854 A | 12/1995 |
| CN | 1145531 A | 3/1997 |

(Continued)

OTHER PUBLICATIONS

Endter; "Die technische Synthese von Cyanwasserstoff aus Methan and Ammoniakohne Zusatz von Sauerstoff"; Chemie Ingenieur Technik, Wiley Vch. Verlag, Weinheim, DE, vol. 30, No. 5, May 1, 1958; pp. 305-310; XP000562734 ISSN: 0009-285X.

(Continued)

*Primary Examiner* — Melissa Swain
(74) *Attorney, Agent, or Firm* — Robert B. Furr, Jr.

(57) ABSTRACT

The invention includes an apparatus and process for the catalytic production of HCN from a feed gas of ammonia and a hydrocarbon gas by means of heat tubes supplying heat to the feed gas stream and heat tubes for removal of heat from the products. The invention further includes a process for $N_2O$ abatement comprising transferring heat from an exothermic $N_2O$ degradation reaction through a heat pipe.

17 Claims, 11 Drawing Sheets

(56) References Cited

U.S. PATENT DOCUMENTS

| | | | |
|---|---|---|---|
| 3,496,215 A | 2/1970 | Drinkard et al. | |
| 3,496,217 A | 2/1970 | Drinkard, Jr. et al. | |
| 3,496,218 A | 2/1970 | Drinkard, Jr. | |
| 3,522,288 A | 7/1970 | Drinkard, Jr. et al. | |
| 3,536,748 A | 10/1970 | Drinkard, Jr. et al. | |
| 3,551,474 A | 12/1970 | Drinkard et al. | |
| 3,564,040 A | 2/1971 | Downing et al. | |
| 3,579,560 A | 5/1971 | Drinkard et al. | |
| 3,607,125 A * | 9/1971 | Kydd | 422/625 |
| 3,655,723 A | 4/1972 | Drinkard, Jr. et al. | |
| 3,694,485 A | 9/1972 | Drinkard, Jr. et al. | |
| 3,752,839 A | 8/1973 | Drinkard, Jr. et al. | |
| 3,766,231 A | 10/1973 | Gosser et al. | |
| 3,766,241 A | 10/1973 | Drinkard, Jr. et al. | |
| 3,773,809 A | 11/1973 | Walter | |
| 3,775,461 A | 11/1973 | Drinkard, Jr. et al. | |
| 3,798,256 A | 3/1974 | King et al. | |
| 3,818,067 A | 6/1974 | Downing et al. | |
| 3,818,068 A | 6/1974 | Wells | |
| 3,846,474 A | 11/1974 | Mok | |
| 3,849,472 A | 11/1974 | Waddan | |
| 3,850,973 A | 11/1974 | Seidel et al. | |
| 3,853,754 A | 12/1974 | Gosser | |
| 3,853,948 A | 12/1974 | Drinkard, Jr. et al. | |
| 3,864,380 A | 2/1975 | King et al. | |
| 3,869,501 A | 3/1975 | Waddan | |
| 3,920,721 A | 11/1975 | Gosser | |
| 3,927,056 A | 12/1975 | Gosser | |
| 3,947,487 A | 3/1976 | Crooks | |
| 4,045,495 A | 8/1977 | Nazarenko et al. | |
| 4,046,815 A | 9/1977 | Nazarenko | |
| 4,076,756 A | 2/1978 | Nazarenko et al. | |
| 4,087,452 A | 5/1978 | Kuntz | |
| 4,146,555 A | 3/1979 | Kershaw | |
| 4,147,717 A | 4/1979 | Kershaw | |
| 4,177,215 A | 12/1979 | Seidel | |
| 4,210,558 A | 7/1980 | Crooks | |
| 4,230,634 A | 10/1980 | Benzie et al. | |
| 4,240,976 A | 12/1980 | Benzie et al. | |
| 4,251,468 A | 2/1981 | Nazarenko | |
| 4,259,303 A | 3/1981 | Nakaji et al. | |
| 4,315,893 A | 2/1982 | McCallister | |
| 4,315,903 A | 2/1982 | Fenton et al. | |
| 4,328,172 A | 5/1982 | Rapoport | |
| 4,330,483 A | 5/1982 | Rapoport | |
| 4,331,632 A | 5/1982 | Galloway | |
| 4,339,395 A | 7/1982 | Barnette et al. | |
| 4,351,806 A | 9/1982 | Galloway | |
| 4,371,474 A | 2/1983 | Rapoport | |
| 4,382,038 A | 5/1983 | McGill | |
| 4,385,007 A | 5/1983 | Shook, Jr. | |
| 4,416,824 A | 11/1983 | Reimer et al. | |
| 4,416,825 A | 11/1983 | Ostermaier | |
| 4,434,316 A | 2/1984 | Barnette | |
| 4,539,302 A | 9/1985 | Leyendecker et al. | |
| 4,705,881 A | 11/1987 | Rapoport | |
| 4,749,801 A | 6/1988 | Bealty et al. | |
| 4,774,353 A | 9/1988 | Hall et al. | |
| 4,793,980 A | 12/1988 | Torobin | |
| 4,874,884 A | 10/1989 | McKinney et al. | |
| 4,925,456 A * | 5/1990 | Egglestone | 48/127.9 |
| 4,932,981 A | 6/1990 | Ohsaki et al. | |
| 4,990,645 A | 2/1991 | Back et al. | |
| 5,107,012 A | 4/1992 | Grunewald | |
| 5,112,686 A | 5/1992 | Krupp et al. | |
| 5,302,756 A | 4/1994 | McKinney | |
| 5,312,959 A | 5/1994 | Sieja et al. | |
| 5,314,673 A | 5/1994 | Anseth et al. | |
| 5,362,454 A * | 11/1994 | Cizmer et al. | 422/201 |
| 5,449,807 A | 9/1995 | Druliner | |
| 5,470,541 A | 11/1995 | Koch et al. | |
| 5,488,129 A | 1/1996 | Huser et al. | |
| 5,512,695 A | 4/1996 | Kreutzer et al. | |
| 5,512,696 A | 4/1996 | Kreutzer et al. | |
| 5,523,453 A | 6/1996 | Breikss | |
| 5,529,669 A | 6/1996 | Koch et al. | |
| 5,543,536 A | 8/1996 | Tam | |
| 5,663,369 A | 9/1997 | Kreutzer et al. | |
| 5,688,986 A | 11/1997 | Tam et al. | |
| 5,696,280 A | 12/1997 | Shapiro | |
| 5,709,841 A | 1/1998 | Reimer | |
| 5,723,641 A | 3/1998 | Tam et al. | |
| 5,773,637 A | 6/1998 | Cicha et al. | |
| 5,821,378 A | 10/1998 | Foo et al. | |
| 5,847,191 A | 12/1998 | Bunel et al. | |
| 5,856,555 A | 1/1999 | Huser et al. | |
| 5,908,805 A | 6/1999 | Huser et al. | |
| 5,936,587 A | 8/1999 | Gudilev et al. | |
| 5,958,273 A | 9/1999 | Koch et al. | |
| 5,959,135 A | 9/1999 | Garner et al. | |
| 6,085,891 A | 7/2000 | Behle | |
| 6,090,987 A | 7/2000 | Billig et al. | |
| 6,121,184 A | 9/2000 | Druliner et al. | |
| 6,127,567 A | 10/2000 | Garner et al. | |
| 6,147,247 A | 11/2000 | Voit et al. | |
| 6,167,298 A | 12/2000 | Levin | |
| 6,169,198 B1 | 1/2001 | Fischer et al. | |
| 6,171,996 B1 | 1/2001 | Garner et al. | |
| 6,173,459 B1 | 1/2001 | Ball | |
| 6,197,992 B1 | 3/2001 | Fischer et al. | |
| 6,219,105 B1 | 4/2001 | Kashiro et al. | |
| 6,242,633 B1 | 6/2001 | Fischer et al. | |
| 6,284,865 B1 | 9/2001 | Tam et al. | |
| 6,287,531 B1 | 9/2001 | Riegert et al. | |
| 6,307,109 B1 | 10/2001 | Kanel et al. | |
| 6,315,972 B1 | 11/2001 | Mehdizadeh et al. | |
| 6,320,582 B1 | 11/2001 | Yamamoto et al. | |
| 6,328,941 B1 | 12/2001 | Watzenberger et al. | |
| 6,355,833 B2 | 3/2002 | Fischer et al. | |
| 6,372,758 B1 | 4/2002 | DeCrescenzo et al. | |
| 6,383,445 B1 | 5/2002 | Anderson et al. | |
| 6,461,481 B1 | 10/2002 | Barnette et al. | |
| 6,469,194 B2 | 10/2002 | Burattin et al. | |
| 6,521,778 B1 | 2/2003 | Fischer et al. | |
| 6,632,561 B1 | 10/2003 | Bauer et al. | |
| 6,646,148 B1 | 11/2003 | Kreutzer | |
| 6,660,877 B2 | 12/2003 | Lenges et al. | |
| 6,723,295 B1 | 4/2004 | Baier et al. | |
| 6,725,083 B1 | 4/2004 | Burbank et al. | |
| 6,737,539 B2 | 5/2004 | Lenges et al. | |
| 6,753,440 B2 | 6/2004 | Druliner et al. | |
| 6,770,770 B1 | 8/2004 | Baumann et al. | |
| 6,801,526 B1 | 10/2004 | Stahl et al. | |
| 6,846,945 B2 | 1/2005 | Lenges et al. | |
| 6,852,199 B2 | 2/2005 | Jungkamp et al. | |
| 6,855,799 B2 | 2/2005 | Tam et al. | |
| 6,897,329 B2 | 5/2005 | Jackson et al. | |
| 6,984,604 B2 | 1/2006 | Cobb et al. | |
| 7,022,866 B2 | 4/2006 | Bartsch et al. | |
| 7,067,685 B2 | 6/2006 | Bartsch et al. | |
| 7,069,978 B2 | 7/2006 | Rosenfeld et al. | |
| 7,070,743 B2 | 7/2006 | Blackwell et al. | |
| 7,084,293 B2 | 8/2006 | Rosier et al. | |
| 7,084,294 B2 | 8/2006 | Jungkamp et al. | |
| 7,098,358 B2 | 8/2006 | Burattin et al. | |
| 7,105,696 B2 | 9/2006 | Burattin et al. | |
| 7,127,252 B1 | 10/2006 | Aoki et al. | |
| 7,253,298 B2 | 8/2007 | Galland et al. | |
| 7,345,006 B2 | 3/2008 | Bartsch et al. | |
| 7,381,845 B2 | 6/2008 | Weiskopf et al. | |
| 7,439,381 B2 | 10/2008 | Jungkamp et al. | |
| 7,442,825 B2 | 10/2008 | Galland et al. | |
| 7,470,805 B2 | 12/2008 | Rosier et al. | |
| 7,521,575 B2 | 4/2009 | Bartsch et al. | |
| 7,528,275 B2 | 5/2009 | Bartsch et al. | |
| 7,531,682 B2 | 5/2009 | Galland et al. | |
| 7,538,240 B2 | 5/2009 | Jungkamp et al. | |
| 7,541,486 B2 | 6/2009 | Scheidel et al. | |
| 7,566,800 B2 | 7/2009 | Scheidel et al. | |
| 7,684,348 B2 | 3/2010 | Zhang et al. | |
| 7,700,795 B2 | 4/2010 | Haderlein et al. | |
| 7,753,852 B2 | 7/2010 | Maschke | |
| 7,781,608 B2 | 8/2010 | Scheidel et al. | |
| 7,973,174 B2 | 7/2011 | Amey | |

(56) References Cited

U.S. PATENT DOCUMENTS

| | | | |
|---|---|---|---|
| 8,039,660 | B2 | 10/2011 | Basset et al. |
| 8,263,804 | B2 | 9/2012 | Buisine et al. |
| 2001/0014647 | A1 | 8/2001 | Fischer et al. |
| 2001/0049431 | A1 | 12/2001 | Tam et al. |
| 2002/0186921 | A1 | 12/2002 | Schumacher et al. |
| 2003/0045740 | A1 | 3/2003 | Druliner et al. |
| 2003/0135014 | A1 | 7/2003 | Radu et al. |
| 2003/0212298 | A1 | 11/2003 | Brasse et al. |
| 2004/0063956 | A1 | 4/2004 | Burattin et al. |
| 2004/0063991 | A1 | 4/2004 | Burattin et al. |
| 2004/0176622 | A1 | 9/2004 | Bartsch et al. |
| 2004/0235648 | A1 | 11/2004 | Bartsch et al. |
| 2004/0260112 | A1 | 12/2004 | Basset et al. |
| 2005/0049228 | A1 | 3/2005 | Albrecht et al. |
| 2005/0090677 | A1 | 4/2005 | Bartsch et al. |
| 2005/0090678 | A1 | 4/2005 | Bartsch et al. |
| 2005/0247624 | A1 | 11/2005 | Jungkamp et al. |
| 2006/0142609 | A1 | 6/2006 | Bourgeois et al. |
| 2006/0175189 | A1 | 8/2006 | Gerber et al. |
| 2006/0252955 | A1 | 11/2006 | Rosier et al. |
| 2006/0258873 | A1 | 11/2006 | Rosier et al. |
| 2006/0258874 | A1 | 11/2006 | Bartsch et al. |
| 2006/0264651 | A1 | 11/2006 | Bartsch et al. |
| 2006/0277828 | A1* | 12/2006 | Licht .......................... 48/198.7 |
| 2007/0060766 | A1 | 3/2007 | Bartsch et al. |
| 2007/0073071 | A1 | 3/2007 | Haderlein et al. |
| 2007/0083057 | A1 | 4/2007 | Haderlein et al. |
| 2007/0088173 | A1 | 4/2007 | Haderlein et al. |
| 2007/0112215 | A1 | 5/2007 | Jungkamp et al. |
| 2007/0155977 | A1 | 7/2007 | Jungkamp et al. |
| 2007/0155978 | A1 | 7/2007 | Jungkamp et al. |
| 2007/0218019 | A1 | 9/2007 | Andre et al. |
| 2008/0015378 | A1 | 1/2008 | Foo et al. |
| 2008/0015380 | A1 | 1/2008 | Foo et al. |
| 2008/0015381 | A1 | 1/2008 | Foo et al. |
| 2008/0015382 | A1 | 1/2008 | Foo et al. |
| 2008/0071105 | A1 | 3/2008 | Bartsch et al. |
| 2008/0076944 | A1 | 3/2008 | Bartsch et al. |
| 2008/0083607 | A1 | 4/2008 | Deckert et al. |
| 2008/0221351 | A1 | 9/2008 | Bartsch et al. |
| 2008/0227214 | A1 | 9/2008 | Jungkamp et al. |
| 2008/0227998 | A1 | 9/2008 | Scheidel et al. |
| 2008/0242883 | A1 | 10/2008 | Jungkamp et al. |
| 2008/0242885 | A1 | 10/2008 | Jungkamp et al. |
| 2008/0242886 | A1 | 10/2008 | Bartsch et al. |
| 2008/0275266 | A1 | 11/2008 | Bartsch et al. |
| 2008/0281119 | A1 | 11/2008 | Scheidel et al. |
| 2008/0281120 | A1 | 11/2008 | Jungkamp et al. |
| 2009/0048466 | A1 | 2/2009 | Lettmann et al. |
| 2009/0054671 | A1 | 2/2009 | Haderlein et al. |
| 2009/0270645 | A1 | 10/2009 | Haderlein et al. |

FOREIGN PATENT DOCUMENTS

| | | |
|---|---|---|
| CN | 1159106 A | 9/1997 |
| CN | 1670139 A | 9/2005 |
| CN | 1857775 A | 11/2006 |
| DE | 2 055 747 | 5/1971 |
| DE | 2343495 A | 3/1975 |
| DE | 2343495 A1 | 3/1975 |
| DE | 10136488 A1 | 2/2003 |
| DE | 102004004671 A1 | 8/2005 |
| FR | 2015115 | 4/1970 |
| FR | 2069411 | 9/1971 |
| FR | 2873696 A1 | 2/2006 |
| GB | 219474 | 7/1924 |
| GB | 1429621 | 3/1976 |
| JP | 49043924 Y1 | 12/1974 |
| JP | 50059324 U | 6/1975 |
| JP | 50059326 U | 6/1975 |
| JP | 51007649 B | 3/1976 |
| JP | 52012698 B | 4/1977 |
| JP | 1013127 C | 9/1980 |
| JP | 55047031 B | 11/1980 |
| JP | 57156454 U | 10/1982 |
| JP | 57156455 U | 10/1982 |
| JP | 57179144 U | 11/1982 |
| JP | 1136333 C | 2/1983 |
| JP | 58067658 U | 5/1983 |
| JP | 58126892 U | 8/1983 |
| JP | 1170710 C | 10/1983 |
| JP | 58159452 U | 10/1983 |
| JP | 60044295 A | 3/1985 |
| JP | 60044295 B | 10/1985 |
| JP | 62294691 | 12/1987 |
| JP | 63135363 U | 9/1988 |
| JP | 1013127 Y2 | 4/1989 |
| JP | 1209830 A | 8/1989 |
| JP | 1136333 U | 9/1989 |
| JP | 1050220 B | 10/1989 |
| JP | 1173751 U | 12/1989 |
| JP | 1565159 C | 6/1990 |
| JP | 3001298 B | 1/1991 |
| JP | 1615749 C | 8/1991 |
| JP | 3205587 | 9/1991 |
| JP | 1627124 C | 11/1991 |
| JP | 1627146 C | 11/1991 |
| JP | 3069915 B | 11/1991 |
| JP | 3285878 A | 12/1991 |
| JP | 1642102 C | 2/1992 |
| JP | 4012248 Y2 | 3/1992 |
| JP | 4057050 U | 5/1992 |
| JP | 4166155 A | 6/1992 |
| JP | 4230254 A | 8/1992 |
| JP | 4057050 B | 9/1992 |
| JP | 4060532 B | 9/1992 |
| JP | 4118676 U | 10/1992 |
| JP | 4128141 U | 11/1992 |
| JP | 1729140 C | 1/1993 |
| JP | 1811422 C | 12/1993 |
| JP | 7025841 Y2 | 6/1995 |
| JP | 7188144 A | 7/1995 |
| JP | 2037346 C | 3/1996 |
| JP | 8504814 A | 5/1996 |
| JP | 8157795 A | 6/1996 |
| JP | 2098106 C | 10/1996 |
| JP | 02521777 Y2 | 1/1997 |
| JP | 02623448 B | 6/1997 |
| JP | 9505586 A | 6/1997 |
| JP | 9512013 A | 12/1997 |
| JP | 10505101 A | 5/1998 |
| JP | 10506911 A | 7/1998 |
| JP | 10509954 A | 9/1998 |
| JP | 02818503 B | 10/1998 |
| JP | 10512879 A | 12/1998 |
| JP | 11501660 A | 2/1999 |
| JP | 11504262 A | 4/1999 |
| JP | 02911608 B | 6/1999 |
| JP | 11507297 A | 6/1999 |
| JP | 2006000451 A | 1/2006 |
| JP | 2006512918 X | 3/2008 |
| JP | 4230254 B | 2/2009 |
| KR | 198802621 Y1 | 7/1988 |
| KR | 198802296 B1 | 10/1988 |
| KR | 199003458 B1 | 5/1990 |
| KR | 199008166 B1 | 11/1990 |
| KR | 199104132 B1 | 6/1991 |
| KR | 199205087 Y1 | 7/1992 |
| NL | 197700262 | 7/1977 |
| NL | 188158 C | 4/1992 |
| WO | WO 79/00193 | 4/1979 |
| WO | WO 95/28228 | 10/1995 |
| WO | WO 97/03040 | 1/1997 |
| WO | WO 97/36855 | 10/1997 |
| WO | WO 02/11108 | 2/2002 |
| WO | WO 02/13964 | 2/2002 |
| WO | 03/015908 A1 | 2/2003 |
| WO | WO 03/015908 | 2/2003 |
| WO | WO 03/018540 | 3/2003 |
| WO | WO 03/031392 | 4/2003 |
| WO | WO 03/068729 | 8/2003 |
| WO | WO 2004/007508 | 1/2004 |

(56) References Cited

FOREIGN PATENT DOCUMENTS

| WO | WO 2007/115936 | 10/2007 |
|---|---|---|
| WO | WO 2008/028843 | 3/2008 |
| WO | WO 2008/052879 | 5/2008 |

OTHER PUBLICATIONS

Grover et al.; "Structures of Very High Thermal Conductance"; Journal of Applied Physics USA; vol. 35, No. 6, 1964, pp. 1990-1991, XP002521688.
Encyclopedia of Chemical Technology (Fourth Edition, vol. 7, pp. 753-782) edited by Kirk-Othmer.
"How to Select a Heat Pipe", Enertron, Inc.
"Design and Technology of Heat Pipes for Cooling and Heat Exchange", Calvin C. Silverstein, 1992, Taylor and Francis [ book furnished upon request ].
Hessel et al.; "Chemiluminescent Reactions in a Heat-Pipe Oven"; Journal of Applied Physics; vol. 46, No. 5; May 1975; pp. 2317-2318; XP002546569; DOI: 10.1063/1.321834.
Sakurai et al; "Chemically Reacting Bismuth and Nitrous Oxide in a Heat Pipe Oven"; Chemical Physics Letters Netherlands; vol. 38, No. 2, Mar. 1, 1976; pp. 234-236; XP002546279; ISSN: 0009-2614; DOI: 10.1016/0009-2614(76)85144-5.
Bett; "High Pressure Technology—4. Manufacture of Pressure Vessels"; Kirk-Othmer Encyclopedia of Chemical Technology; Dec. 4, 2000; pp. 37-42; XP002546843; DOI: 10.1002/0471238961.0809070802052020.a01.
Galle et al.; "Thermal N2O decomposition in regenerative heat exchanger reactors"; Chemical Engineering Science; Elsevier Ltd.; GB; vol. 56, No. 4; Mar. 19, 2001; pp. 1587-1595; XP002546570; DOI: 10.1016/S0009-2509(00)00386-9.
Enertron Inc.; "Heat Pipe Selection" [Online], Apr. 12, 2001; XP002521762; retrieved from the Internet: URL:http://www.enertron-inc.com/enertron-resources/library.php.
Kosoy; "Heat Pipes"; Kirk-Othmer Encyclopedia of Chemical Technology; [Online]; vol. 13; Nov. 19, 2004; pp. 225-241; XP002546842; DOI: 10.1002/0471238961.0805012002090514.a01.pub2.
Endter; "Die technische Synthese von Cyanwasserstoff aus Methan and AMmoniakohne Zusatz von Sauerstoff"; Chemie Ingenieur Technik, Wiley Vch. Verlag, Weinheim, DE, vol. 30, No. 5, May 1, 1958; pp. 305-310; XP 000562734, ISSN: 0009-285X.
Grover et al.; "Structures of Very High Thermal Conductance", Journal of Applied Physics USA; vol. 35, No. 6, 1964, pp. 1990-1991; XP 002521688.
Hessel et al.; "Chemiluminescent Reactions in a Heat-Pipe Oven", Journal of Applied Physics, vol. 46, No. 5, May 1975, pp. 2317-2318, XP 002546569, DOI: 10.1063/1.321834.
Sakurai et al., "Chemically Reacting Bismuth and Nitrous Oxide in a Heat Pipe Oven", Chemical Physics Letters Netherlands; vol. 38, No. 2, Mar. 1, 1976; pp. 234-236; CP 002546279; ISSN: 0009-2614; DOI: 10.1016/0009-2614(76)85144-5.
Bett; "High Pressure Technology—4. Manufacture of Pressure Vessels", Kirk-Othmer Encyclopedia of Chemical Technology; Dec. 4, 2000; pp. 37-42; XP 002546843; DOI: 10.1002/0471238961.0809070802052020.a01.
Galle et al.; "Thermal N2O decomposition in regenerative heat exchanger reactors"; Chemical Engineering Science; Elsevier Ltd.; GB; vol. 56, No. 4, Mar. 19, 2001; pp. 1587-1595; XP 002546570; DOI: 10.1016/S0009-2509(00)00386-9.
Enertron Inc.; "Heat Pipe Selection" [Online], Apr. 12, 2001; XP 002521762; retrieved from the Internet: www.enertron-inc.com/enertron-resources/library.php.
Kosoy; "Heat Pipes"; Kirk-Othmer Encyclopedia of Chemical Technology; [online]; vol. 13, Nov. 19, 2004, pp. 225-241; XP 002546842; DOI: 10.1002/0471238961.0805012002090514.a01.pub2.
PCT International Search Report and Written Opinion of the International Searching Authority dated Sep. 22, 2009.
"Structures of Very High Thermal Conductance", Journal of Applied Physics 35 (6) 1964; published by G. M. Grover, T. P. Cotter and G. F. Erickson.
"Design and Technology of Heat Pipes for Cooling and Heat Exchange", Calvin C. Silverstein, 1992, Taylor and Francis [book furnished upon request].

* cited by examiner

HIGH EFFICIENCY REACTOR AND PROCESS

CROSS-REFERENCE TO RELATED APPLICATIONS

This application claims benefit of U.S. Provisional Application No. 60/917,706, filed May 14, 2007, which is incorporated herein by reference in its entirety.

FIELD OF THE INVENTION

The invention relates to process improvements to gas phase reactions conducted at elevated temperatures. More particularly the invention relates to processes in which a heat pipe is in thermal communication with a reactor. These process improvements are more particularly illustrated by reference to the endothermic catalytic synthesis of hydrogen cyanide and the exothermic decomposition of nitrous oxide.

BACKGROUND OF THE INVENTION

Hydrogen cyanide (HCN), also known as hydrocyanic acid, is an industrial chemical with many uses in the chemical, mining, and pharmaceutical industries. For example, HCN is a raw material for the manufacture of adiponitrile for use in producing polyamides such as nylon 66 and nylon 6. Other uses include manufacture of acrylic plastics; sodium cyanide for use in gold recovery; and intermediates in the manufacture of pesticides, agricultural products, chelating agents, and animal feed.

It is known to make HCN from compounds containing hydrogen, nitrogen, and carbon at high temperatures, with or without a catalyst. Known HCN processes include the Andrussow process, the BMA process or, to a lesser extent, the Shawinigan process. A description is provided, for example, in the Encyclopedia of Chemical Technology (Fourth Edition, Volume 7, pages 753 to 782) edited by Kirk-Othmer. Other processes for making HCN, not significantly exploited commercially due to unsatisfactory economics, include formamide decomposition, methanol ammonolysis, and reaction of acid with sodium cyanide. HCN is also a by-product of the Sohio process for the synthesis of acrylonitrile from propene and ammonia.

The Andrussow et al. endothermic HCN synthesis reaction is well-known. Thermal energy is supplied to the synthesis via exothermic co-combustion of excess methane with oxygen. U.S. Pat. No. 1,957,749 discloses the catalytic production of hydrocyanic acid (IG FARBENINDUSTRIE AG) by interaction of ammonia, a vaporizable hydrocarbon and a gas comprising free oxygen, at a temperature between 750° C. and 1250° C. and in the presence of a metallic catalyst described generally by Equation 1.

$$CH_4 + NH_3 + 1.5 O_2 \rightarrow HCN + 3H_2O \quad (1)$$

The reaction proceeds at temperatures of about 1,100° C. over precious metal catalysts, typically platinum (Pt), platinum-rhodium (Pt/Rh) or platinum-iridium alloy, in gauze form at about atmospheric pressure. Other process schemes include purification of the feed streams, preheating of the feed mixtures, and use of $O_2$ enriched air as well as 100% $O_2$ as the oxygen source.

The BMA process for HCN synthesis is also known. U.S. Pat. No. 2,768,876 discloses the catalytic process for the production of HCN from volatile hydrocarbons and where mixtures of volatile hydrocarbons and ammonia are in the gaseous phase in the presence of a platinum metal catalyst at atmospheric pressure. The step of reacting this gas mixture is in the presence of a platinum metal catalyst in a heated reaction chamber with walls of a ceramic material composed of 0.7 to 8% of $SiO_2$ and the remainder alumina.

The BMA process involves the endothermic reaction of methane and ammonia according to Equation 2.

$$CH_4 + NH_3 \rightarrow HCN + 3H_2 \quad (2)$$

The BMA process limits undesirable side reactions associated with other processes for making HCN by the elimination of $O_2$ in the feed gases. In this process, methane and ammonia are reacted in the absence of oxygen at temperatures above about 1200° C. The reaction is performed in externally heated sintered alumina (ceramic) tubes within a furnace, the tubes being coated with platinum.

Koch et al., in U.S. Pat. Nos. 5,470,541 and 5,529,669, disclose a process and apparatus for making HCN, including the preparation of HCN from the reaction of ammonia vapor and a hydrocarbon gas over a platinum group metal catalyst while providing heat using single mode microwave irradiation. Substantial heat energy input is required to provide the high process temperature due to the endothermic character of the process. These disclosures are incorporated by reference herein.

U.S. Pat. Nos. 5,958,273; 6,287,531; 6,315,972; and 7,070,743 disclose, collectively, a process and apparatus for making HCN, including the preparation of HCN from the reaction of ammonia vapor and a hydrocarbon gas over a platinum group metal catalyst while using induction heating as a source of energy. These disclosures are incorporated by reference herein.

The elevated temperatures employed for these gas-phase reactions (when catalyzed using one or more platinum group metals suffer from shortened catalyst life. This observation in the Andrussow process may be associated with rapid restructuring of the catalyst structure and a higher pressure drop.

In the foregoing processes, the emerging product stream must be promptly cooled below about 300° C. to prevent thermal degradation of the HCN. Additionally, unreacted ammonia, "ammonia breakthrough," must be removed. Ammonia may catalyze the polymerization of HCN, a process hazard. Typically, the ammonia is recovered and recycled; in smaller units it may be flared or removed as ammonium sulfate.

Heat pipes, also known as heat tubes, are sealed hollow tubes of a thermoconductive metal, containing a small quantity of a working fluid to transport thermal energy primarily through vaporization and condensation. The hollow tube that contains the working fluid is also known as the heat tube envelope.

The principle of a heat pipe employing the benefits of capillary action were noted by George Grover et al. at Los Alamos National Laboratory and subsequently published by Grover, G. M., T. P. Cotter, and G. F. Erickson in the *Journal of Applied Physics* 35 (6) 1964; "Structures of Very High Thermal Conductance."

Internally, the heat pipe's tubing may have wick structure on the side-walls exerting a capillary force on the liquid phase of the working fluid. This wick structure is typically a sintered metal powder or a series of grooves parallel to the tube axis, but it may in principle be any material capable of soaking up the working fluid. If the heat pipe has a continual slope with the heated end down, a wick structure is optional. Heat pipes have no moving parts.

The heat pipe mechanism relies on a vapor pressure over the hot liquid working fluid at the hot end of the pipe to be higher than the equilibrium vapor pressure over condensing working fluid at the cooler end of the pipe. It is this pressure difference that drives a rapid mass transfer to the condensing end where the excess vapor condenses and releases its latent heat. The condensed working fluid then flows back to the hot end of the pipe. In the case of vertically-oriented heat pipes the fluid may be moved by the force of gravity. In the case of heat pipes containing wicks, the fluid is returned by capillary action. Because the heat pipe is evacuated and then charged with the working fluid prior to being sealed, the internal pressure is set by the vapor pressure of the working fluid. Applications of heat pipes well-known in the art include: cooling systems, in space craft as a means for thermal management of internal temperature and in computer systems to remove heat from high speed central processor units.

A heat pipe can be used for conveying thermal energy to or away from a chemical reactor. Examples of such heat pipe applications are disclosed in at least U.S. Pat. No. 4,351,806 and U.S. Pat. No. 4,315,893.

U.S. Pat. No. 7,069,978 to Rosenfeld, et al. discloses problems with efforts to use aluminum envelope material and water as the preferred working fluid because aluminum oxide is compatible with water, even though aluminum metal is not compatible. The large difference in thermal expansion between aluminum and its oxide and resulting stresses cause the oxide layer to crack, often on the first thermal cycle, resulting in heat pipe failure. The '978 patent proposes a magnesium alloy envelope with a protective layer formed on the inside wall of the envelope to be compatible with the working fluid.

While HCN can be produced by the reaction of methane and ammonia in the presence of a platinum group metal catalyst, there remains a need to improve the thermal efficiency of the basic reaction and thus the economics of HCN production. Particularly important is the minimization of thermal energy use and ammonia breakthrough in maximizing the HCN production rate. Additional considerations include the preservation of the catalyst integrity and amount of precious metal catalyst in the reaction zone.

However, as discussed above, the commercial production of HCN occurs at elevated temperatures of about 1,100° C. over precious metal catalysts.

Heat pipe metallurgy and working fluids, axial heat flux and surface heat flux, are disclosed in "How to Select a Heat Pipe", Enertron, Inc. (available from http://www.enertron-inc.com/enertron-resources/library.php). In particular, sodium working fluid and nickel, stainless steel vessel or envelope material are disclosed as suitable for temperature ranges of 500° C. to 900° C. Lithium working fluid and niobium+1% zirconium vessel or envelope material are disclosed as suitable for temperature ranges of 900° C. to 1500° C.

It would be uneconomical to design a commercial reaction vessel of exotic and expensive materials, despite other possible benefits flowing from the use of a heat pipe in a high temperature process.

An economically feasible, commercial reaction vessel, using affordable materials of construction to make a heat pipe device suitable for use at high temperatures, would be highly desirable. Methods of conducting various chemical reaction processes employing such a heat pipe device and reaction vessel for high temperature chemical reactions would also be highly desirable.

SUMMARY OF THE INVENTION

The present invention provides an economically feasible, commercial reaction vessel, using affordable materials of construction to make a heat pipe device suitable for use at high temperatures.

The present invention also provides methods of conducting various chemical reaction processes employing such a heat pipe device and reaction vessel for high temperature chemical reactions.

An aspect of the invention provides a process for synthesizing HCN in a sustained continuous endothermic reaction. The process steps comprise: reacting, using a catalyst, a portion of methane-containing hydrocarbon gas and a portion of ammonia gas at a reaction temperature above about 1000° C. in a reaction zone to form products and conveying thermal energy to the reaction zone using means for thermal energy conveyance including at least a heat pipe apparatus and quenching the products in a quench zone and conveying thermal energy from the quench zone using means for thermal energy transfer which may include at least a heat pipe. The reaction of ammonia and methane is typically carried out in the absence of added oxygen, and more typically in the absence of readily measurable amounts of oxygen. In another embodiment of the invention, the reaction temperature may be above 1100° C.

Another aspect of the invention provides a continuous catalytic process for synthesizing HCN comprising:
  (a) charging methane and ammonia reactants to a reaction zone;
  (b) providing a heat tube in said reaction zone; and
  (c) controlling the rate of heat transfer from the heat tube to the reactants at a rate greater than 5 watts/cm$^2$ and at a temperature greater than 1000° C. to improve HCN selectivity and/or yield.

Another aspect of the invention provides a continuous catalytic process for synthesizing HCN comprising:
  (a) charging methane and ammonia reactants to a reaction zone having an outer wall; and
  (b) providing a heat transfer tube for transferring heat to the reactants at a rate greater than 5 watts/cm$^2$ at a temperature greater than 1000° C. wherein the inner surface temperature of the portion of the heat transfer tube in contact with the reactants varies less than 10° C., for example, less than 10° C.

An embodiment of the invention may optionally include recovering thermal energy from reaction products at a heat transfer rate greater than 10 watts/cm$^2$ at a temperature less than 1200° C., for example less than 1100° C. or 1000° C.

One suitable reactor of the invention may use 1 inch (2.54 cm) O.D. heat tubes with a 56.5 inch (1.44 m) long condensing (reaction) section. The power output per tube can be 24.2 kW with an axial heat transfer rate of 4.8 kW/cm$^2$ (based on OD). The transfer of energy to the reactants at the surface of the tube was estimated at 21 watts per cm$^2$.

Another reactor of the invention may produce a nominal 100 kt per year of HCN using approximately 933 tubes on 1.5-inch (3.81 cm) centers arranged in 25 planes with a nominal 37 tubes per plane, using a nominal 5 foot×5 foot (1.5 m×1.5 m) reactor cross section. The reactor can be larger if needed based upon an assumption of lower heat transfer rates. For example, if the assumed heat transfer rate (per square area) is reduced by a factor of 4, then the total heat transfer area would need to be increased by a factor of 4 for the same production capacity).

Another aspect of the invention provides an apparatus for synthesizing HCN in a continuous endothermic reaction, for example, a sustained continuous endothermic reaction. Provided is a reactor for synthesizing HCN from a feed gas, substantially comprising gas phase ammonia and gas phase methane, in a sustained continuous endothermic reaction. The reactor comprises: a preheat zone, a first stage reaction zone, a second stage reaction zone, and quench zone.

In the preheat zone for elevating the temperature of the feed gas to a first temperature (between 800° C. and 1000° C.) a first heat pipe means can be provided with a coating, or layer, disposed on the outer surface of the first heat pipe means effective to inhibit the decomposition of the feed gases (methane and ammonia). For example, the coating can be a nonreactive coating. When the first heat pipe means is coated, the coating can be directly applied to the surface by methods known in the art including, but not limited to, applied by spray, plasma applied, applied by electroplating, and applied by wash coating. Alternatively, the second heat pipe means may be inserted into a coated ceramic (e.g., alumina-containing ceramic) sheath.

The reactor's first stage reaction zone may comprise heat pipe means with a first catalyst disposed on at least a portion of the surface of the heat pipe means and is effective to elevate the feed gas to a second temperature (between 1000° C. and 1300° C.) above said first temperature; and to convert reactants to products, for example, to complete more than 40 percent of the single pass conversion of feed gases to reaction products.

The first catalyst may have any known form, such as, but not limited to wire gauze, foil, foam, supported catalyst sheath, impregnated coatings, and wash coatings. The amount of catalyst is any amount that is effective to convert one or more reactants to one or more products. When the first catalyst is a coating, the coating can be directly applied to the surface by methods known in the art including, but not limited to, applied by spray, plasma applied, applied by electroplating, and applied by wash coating. Alternatively, the heat pipe may be inserted into a coated ceramic (e.g., alumina-containing ceramic) sheath.

The reactor's second stage reaction zone may comprise a second catalyst in the form of a wire gauze, comprising 90% by weight platinum and 10% by weight rhodium, for providing further conversion of the feed gas to reaction products. In the second stage reaction zone, the total conversion may approach 50% or greater based upon raw feed to the first reaction zone. Alternatively, the second catalyst may have any known form such as, but not limited to wire gauze, tablets, pellets, and monoliths (e.g., foam).

The reactor's quench zone may comprise a second heat pipe means effective for rapid cooling of the reaction products to a temperature of less than 500° C. The second heat pipe means may optionally be coated, or have a layer, disposed on the outer surface of the first heat pipe means with an inhibitor to effectively to decrease the decomposition of a portion of the reaction products (HCN). When the second heat pipe means is coated, the coating can be directly applied to the surface by methods known in the art including, but not limited to, applied by spray, plasma applied, applied by electroplating, and applied by wash coating. Alternatively, the second heat pipe means may be inserted into a coated ceramic (e.g., alumina-containing ceramic) sheath.

The reactor's quench zone optionally comprises a second coated heat pipe means effective for rapid cooling of the reaction products to a temperature of less than 500° C.; and wherein, the second coated heat pipe means is selectively effective to decompose at least a portion of any unreacted ammonia.

BRIEF DESCRIPTIONS OF THE DRAWINGS

DETAILED DESCRIPTION

Figure 1:
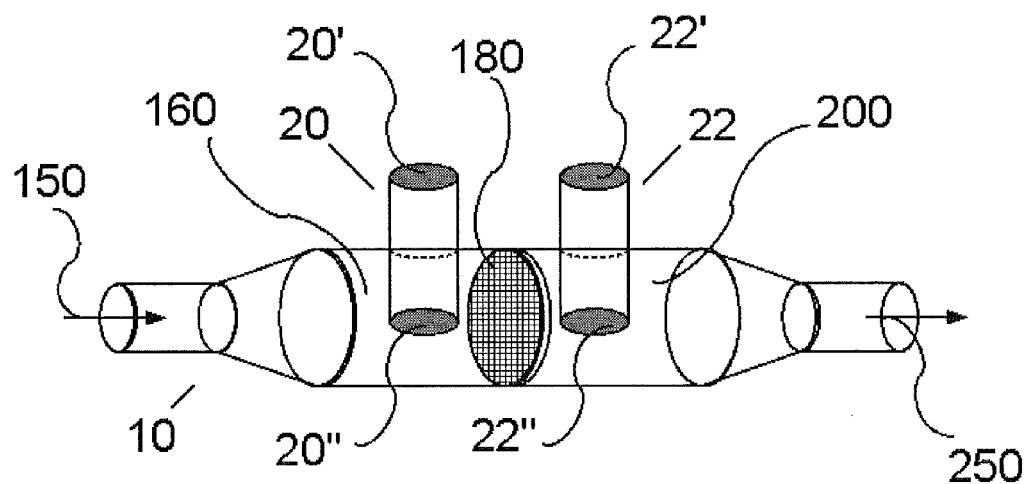
FIG. 1 is a representation of an apparatus provided with heat tubes and adapted for use in the processes disclosed herein.

The invention includes a process and an apparatus for conducting elevated temperature gas phase reactions. For example, the invention includes those gas phase reactions in which the energy associated with preheating the reactants, sustaining the reaction, and quenching effluent is conveyed by means of at least a heat pipe. The heat pipe of the invention provides beneficial improvements in temperature uniformity of the catalyst and a high heat transfer rate. The heat recovery from high temperature sources used may improve process yield and lower energy consumption.

The invention includes a process for reacting at least a reactant in at least a reaction zone at a temperature wherein the temperature is sufficient to promote the reaction of the at least one reactant, optionally in the presence of a catalyst, and wherein the temperature in the at least one reaction zone is provided by means for conveying thermal energy to or from the at least one reaction zone and forming at least one product.

At least a reaction zone means one or more volume elements into which a reactant or reactants are introduced and one or more products are withdrawn.

Within the scope of the definition of reactant or product it is further contemplated to also mean thermal energy.

Embodiments of the invention include the use of heat pipe means in processes for the synthesis of HCN and for the auto-thermal decomposition of nitrous oxide ($N_2O$).

The HCN process of the invention includes reacting a process feed gas comprising a portion of methane gas and a portion of ammonia gas at a temperature above about 1000° C. in a reaction zone, for example in a reaction zone substantially free of added oxygen or substantially free of a commercially measurable amount of oxygen. The reaction zone for the HCN process of the invention can include means for conveying thermal energy including at least one heat pipe.

Another aspect of the invention relating to the synthesis of HCN provides for a sustained continuous endothermic reaction comprising transferring thermal energy to the reactants at a rate greater than 5 watts/cm$^2$ at a temperature greater than 1000° C.

Provided in another aspect of the invention is an apparatus, for example, a reactor, for the synthesis of HCN in a sustained continuous endothermic reaction. The reactor input is a feed gas, substantially comprising gas phase ammonia and gas phase methane. The reactor comprises four zones: a preheat zone, a first stage reaction zone, a second stage reaction zone, and quench zone.

In the preheat zone, the temperature of the feed gas is elevated to a first temperature, between 800° C. and 1000° C. In this preheat zone a first heat pipe means is provided with a nonreactive coating. This nonreactive coating is effective to inhibit the decomposition of the input feed gases, methane and ammonia.

The reactor's first stage reaction zone may comprise heat pipe means coated with a first platinum group metal catalyst. The first stage of the reaction zone with catalyst can elevate the feed gases to a second temperature, above said first temperature and between 1000° C. and 1300° C., to complete more than 10 percent of the single pass conversion of feed gases to reaction products.

The reactor's second stage reaction zone may comprise a second catalyst in the form of a wire gauze, comprising 90% by weight platinum and 10% by weight rhodium, for providing conversion of the feed gas to reaction products and enhancing the single pass conversion to more than 50 percent. Alternatively, the second catalyst may have other known forms such as, but not limited to, wire gauze, tablets, pellets, and monoliths (e.g., foam).

The reactor optionally comprises repeating instances of a first stage reaction zone and a second stage reaction zone.

The reactor's quench zone may comprise a second coated heat pipe means effective for rapidly cooling of the reaction products to a temperature of less than 500° C. The second coated heat pipe means, located in the quench zone, can be selectively effective to inhibit the decomposition of a portion of the reaction products (HCN). The coating to the heat pipe prevents loss of HCN yield.

The reactor's quench zone optionally comprises a second coated heat pipe means effective for rapid cooling of the reaction products to a temperature of less than 500° C.; and wherein, an additional coated heat pipe means has a coating selectively effective to promote the decomposition of "break through" ammonia.

The invention contemplates the use of heat pipe means with a catalytic chemical reactor where the heat pipe means is partially or fully in contact with the catalyst.

The Applicant's invention contemplates the use of heat pipe means with a chemical reactor where the energy is recovered from the reaction products using heat pipes.

The Applicant's invention contemplates the use of heat pipe means with a catalytic chemical reactor for the thermal abatement of N$_2$O, which is a byproduct of nitric acid oxidation of alcohols and ketones. In the oxidation of cyclohexanone and cyclohexanol to adipic acid, N$_2$O was identified as a "green house" gas. Efforts are underway globally to diminish the amount of N$_2$O released to the atmosphere from these processes.

The processes for abatement of N$_2$O emission to the environment include: (1) combustion, (2) auto thermal decomposition, and (3) catalytic decomposition.

Combustion based processes, known for more than 50 years, utilize N$_2$O as a source of oxygen to react with a fuel to generate heat while destroying the N$_2$O molecule. This process consumes a substantial quantity of fuel but can offer advantages at locations where it is desirable to produce and export steam from the process. High fuel consumption, high investment, generation of NO$_x$, and high maintenance costs are associated with the combustion based process.

It is known that the N$_2$O molecule will thermally decompose into nitrogen and oxygen at temperatures exceeding approximately 800° C., forming quantities of economically recoverable NO$_x$. The thermal processes employ a combination of heat exchangers, pilot burners, staged combustion, and heat storage to initiate and stabilize a continuous thermal decomposition reaction regime. A thermal decomposition process is disclosed by U.S. Pat. No. 6,328,941 (to BASF). High levels of NO$_x$ formation, high maintenance costs, and high investment are characteristics of auto-thermal N$_2$O abatement practices.

A catalytic process for N$_2$O decomposition is known. This process is effectively carried out at lower temperatures. Examples of catalysts and processes are disclosed by at least U.S. Pat. No. 5,314,673; U.S. Pat. No. 4,259,303; U.S. Pat. No. 4,793,980; and U.S. Pat. No. 6,723,295. These catalysts typically have a relatively narrow operating temperature window below which no reaction takes place and above which the catalyst deactivates. Due to the highly exothermic nature of the decomposition, a dilute N$_2$O feed stream of ca. 10% by volume concentration with a preheat is used. The dilution requirement imposes the need for a diluent of about 2-3× the volume of the original N$_2$O containing process gas stream. As a result, process equipment must be sized accordingly. High initial investment and routine catalyst replacement characterize such processes.

The invention includes a process for N$_2$O abatement that includes transferring heat from the exothermic N$_2$O degradation reaction using heat pipes. The heat pipe means can be employed to support an auto-thermal N$_2$O abatement process sustaining a continuous decomposition reaction, and achieving near complete destruction of N$_2$O, without the addition of fuels, reducing agents, or external energy. In such a process the heat pipe would provide a means for transporting the heat released during N$_2$O decomposition to inlet of the reactor to provide the preheating necessary to initiate the decomposition reaction. Such a process would require an external energy source only during start up, or operation with low N$_2$O concentration.

In yet another concept a heat pipe means is applied to a catalytic N$_2$O process to provide a highly uniform temperature catalyst bed and a high thermal transfer rate for bringing heat to the reaction feeds and taking heat away from the products.

The heat pipe materials of construction and working fluid chosen depend upon the temperature conditions in which the heat pipe must operate. Working fluids range from liquid helium or nitrogen for extremely low temperature applications to silver, lithium, sodium or potassium for high temperature conditions. The internal pressure developed within the heat pipe is the vapor pressure of the working fluid, which varies with heat pipe temperature. A known advantage of the heat pipe is the great efficiency in transferring heat. Heat pipes are substantially superior to thermal conductors of an equivalent cross-section of solid copper. It is known that heat pipe fluxes of more than 200 megawatts per square meter are possible.

At elevated temperature and constant stress or load many materials deform at a slow continuous rate, a behavior known as creep. Creep is the term used to describe the tendency of a solid material to slowly move or deform permanently under the influence of stresses. It occurs as a result of long term exposure to levels of stress that are below the yield strength or ultimate strength of the material. Creep is more severe in materials that are subjected to heat for long periods, and at elevated temperature. Creep always increases with temperature. The rate of this deformation is a function of the material properties, exposure time, exposure temperature and the applied load (stress). Depending on the magnitude of the applied stress and its duration, the deformation may become so large that a component can no longer perform its function. In the case of a heat pipe envelope material, creep may ultimately result in failure of the envelope.

The processes of the invention for synthesing HCN and for the autothermal destruction of $N_2O$ both operate at elevated temperatures. The pressure of the working fluid acting on the heat pipe shell (also known as the envelope) can provide stress sufficient to induce creep with many otherwise desirable low cost materials for envelope construction. In one embodiment of the invention the stress normally associated with the working fluid pressure is substantially reduced by balancing the process pressure and the working fluid pressure, greatly reducing stress on the envelope and related creep deformation, and thereby extending the operating temperature range for the heat pipe and enabling the use of relatively low cost materials of construction.

The pressure within the reactor may be controlled such that the absolute difference between reaction zone pressure and the pressure of the working fluid within the heat pipe envelope is minimized, thus greatly reducing the stress on the envelope. The reduction in stress thereby enables the use of lower cost envelope materials and working fluids at higher temperatures and with longer life expectancy. In one embodiment, the pressure within the reactor is controlled such that the absolute difference between reaction zone pressure and the pressure of the working fluid within the heat pipe envelope is less than about 14.7 psi (101 kPa).

In other embodiments, the pressure within the reactor is controlled such that the reaction zone pressure is approximately equal to the pressure of the working fluid within the heat pipe envelope, i.e. the absolute difference between reaction zone pressure and the pressure of the working fluid within the heat pipe envelope is less than about 5 psi (34 kPa) or less than about 1 psi (7 kPa).

Figure 11:
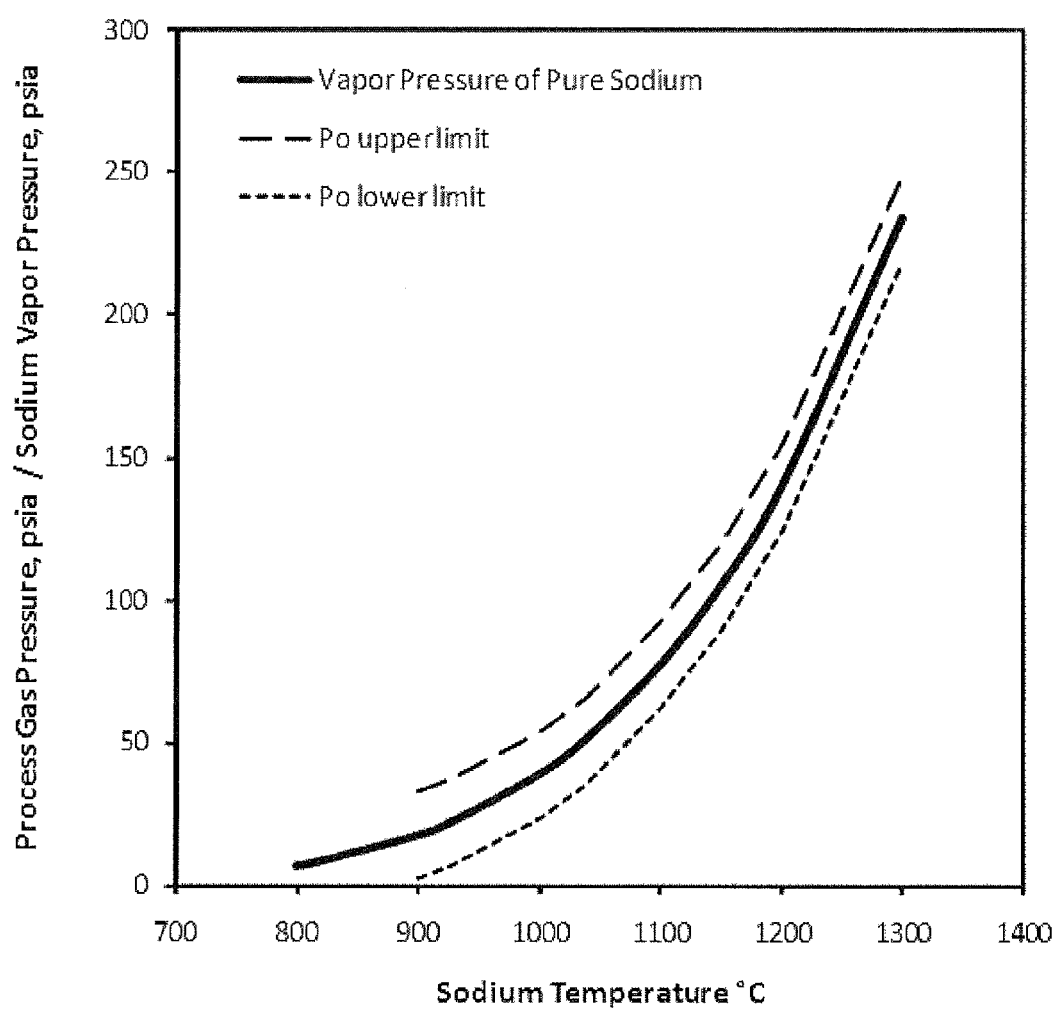
FIG. 11 is a plot illustrating the relationship between operating pressure and working fluid pressure for an embodiment of the invention.

In embodiments of the invention, the pressure of the working fluid may be measured by known means or may be estimated for any given working fluid from a measured temperature, such as reactor temperature, heat pipe envelope temperature, or working fluid temperature. For example, as illustrated in FIG. 11, when sodium is used as the heat pipe working fluid and the process operating pressure on the exterior of the heat pipe (Po, measured in psia) when calculated as a function of the heat pipe working fluid temperature (T, measured in ° C.) satisfies the following equation:

$$Po = a_{Na}T^3 - b_{Na}T^2 + c_{Na}T - d_{Na}$$

where:
Po is in psia,
T is in the range of 900 to 1300° C.,
$a_{Na}$ is equal to $1.2 \times 10^{-6}$,
$b_{Na}$ is equal to $2.7405 \times 10^{-3}$,
$c_{Na}$ is equal to 2.1643, and
$d_{Na}$ is in the range of 570 to 600.

Varying the value of $d_{Na}$ as indicated above (e.g., from 570 to 600) defines an operating pressure band between the upper and lower limits of Po.

While the embodiment described by the equation and chart indicate a specific methodology for reducing creep when sodium is the working fluid, it should be noted that the general methodology applies to all working fluids operating at a temperature where creep is a significant factor in the selection of the envelope material. Such working fluids include at the least cesium, potassium, lithium, and silver.

It is to be understood that in any instance where a heat tube is mentioned herein (e.g., 20, 20A, 20B, 21, 22), it is to be understood that either a single heat tube or a plurality of heat tubes may be utilized to perform the function of the indicated heat tube.

Referring now to FIG. 1, a reactor 10 is provided with heat tubes (20, 22) adapted for use in a process of contacting, at atmospheric pressure or greater, a reactant stream 150 comprising ammonia and methane with a catalyst 180 to form a product stream 250 comprising HCN. As an option in place of methane, any hydrocarbon gas of 2 to 6 carbon atom may be used. Heat tube 20 is located in a first reaction zone 160 of reactor 10 where reactant stream 150, previously heated to a temperature between 800 and 1000° C., is brought into contact with a catalyst (0.1 to 20% by weight Pt group metal). In every instance of a first reaction zone catalyst described herein, various catalyst compositions and forms are contemplated and described and may be used interchangeably. Optionally as a means for preheating, a heat tube provided with a ceramic coating which substantially eliminates decomposition of ammonia and methane at the preheat temperature is provided. Most generally, the heat tube 20 has a catalyst disposed on at least a portion of the outer surface. The end 20' of heat tube 20 is hotter than end 20" and is heated by means of a heat source (not shown). Sufficient heat is transferred from the heat source through the heat tube 20 to elevate and maintain the temperature of the reactant stream to between 1000° C. and 1300° C. and convert reactants to products, for example 40 percent conversion or greater based on raw feed. The heat tubes employed are selected to provide best performance in the working temperature range required. The reactant stream is further directed to contact catalyst 180 of Pt/Rh (90% by weight Pt/10% by weight Rh) wire gauze through which greater than about 90 percent conversion to products takes place. Alternatively, the catalyst 180 may be one or more other known forms, such as foam, and may have other compositions known to effectively promote the formation of HCN, such as 85% by weight Pt/15% by weight Rh. The product stream is quenched in temperature in reactor zone 200 by means of heat tube 22 where heat tube end 22' is cooler than tube end 22". Heat tube end 22' is in thermal contact with known cooling means which transfers heat from tube end 22" and the reaction products to bring their temperature to less than 500° C. A known ceramic coating, such as alumina, on heat tube 22 is provided which effectively suppresses decomposition of HCN in the product stream. The HCN is recovered from the product stream in the known manner.

Figure 2:
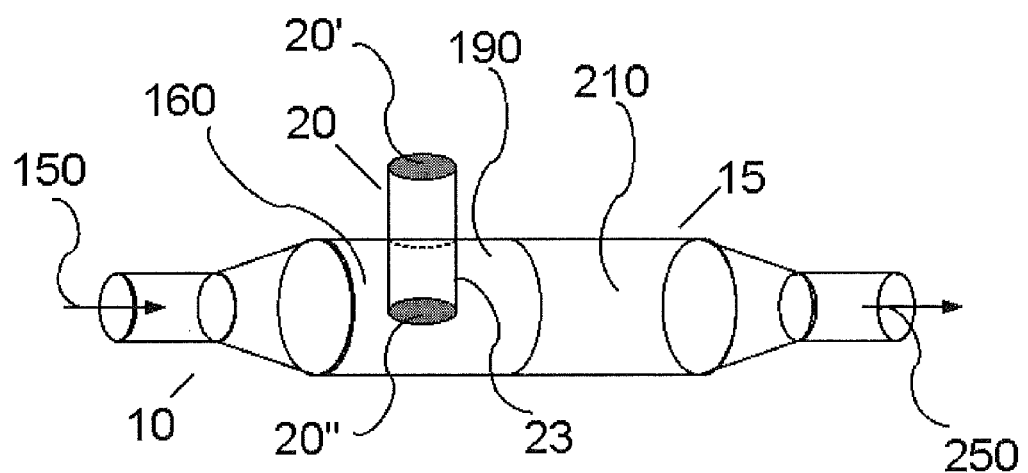
FIG. 2 is a second representation of an apparatus provided with a heat tube and adapted for use in the processes disclosed herein.

Referring now to FIG. 2, the reactor 10 is provided with heat tubes (20) adapted for use in a process of contacting, at atmospheric pressure or greater, the reactant stream 150 with a catalyst to form the product stream 250. Heat tube 20 is located in the first reaction zone 160 of reactor 10 where reactant stream 150, previously heated to a temperature between 800 and 1000° C., is brought into contact with a catalyst (0.1 to 20% by weight Pt group metal). Optionally as a means for preheating, a heat tube provided with a ceramic coating which substantially eliminates decomposition of ammonia and methane at the preheat temperature is provided. Most generally, the heat tube 20 has a catalyst 23 disposed on at least a portion of the outer surface. The end 20' of heat tube 20 is hotter than end 20" and is heated by means of a heat source (not shown). Sufficient heat is transferred from the heat source through the heat tube 20 to elevate and maintain the temperature of the reactant stream to between 1000° C. and 1300° C. and convert reactants to products, for example 40 percent conversion or greater based on raw feed. The heat tubes employed are selected to provide best performance in the working temperature range required. The reactant stream is further directed to a second reaction zone 190, optionally containing a contact catalyst of Pt/Rh (90% by weight Pt/10% by weight Rh) wire gauze through which further conversion to products may take place. The product stream is quenched in temperature in a quench zone 210 by a rapid cooling means 15 to bring the temperature to less than 500° C. Optionally, as a rapid cooling means, a heat tube, with a known ceramic coating that effectively suppresses decomposition of HCN in the product stream, and in thermal contact with known cooling means, transfers heat from the reaction products to bring their temperature to less than 500° C. The HCN is recovered from the product stream in the known manner.

Figure 3:
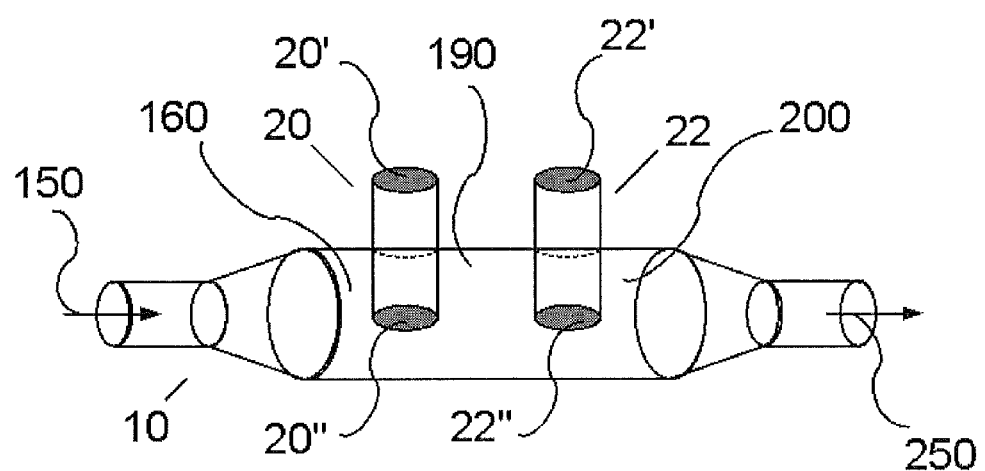
FIG. 3 is a third representation of an apparatus provided with heat tubes and adapted for use in the processes disclosed herein.

Referring now to FIG. 3, the reactor 10 is provided with heat tubes (20, 22) adapted for use in a process of contacting, at atmospheric pressure or greater, the reactant stream 150 with a catalyst to form the product stream 250. The heat tube 20 is located in the first reaction zone 160 of the reactor 10 where the reactant stream 150, previously heated to a temperature between 800 and 1000° C., is brought into contact with a catalyst (0.1 to 20% by weight Pt group metal). Optionally as a means for preheating, a heat tube provided with a ceramic coating which substantially eliminates decomposition of ammonia and methane at the preheat temperature is provided. Most generally, the heat tube 20 has a catalyst disposed on at least a portion of the outer surface. The end 20' of heat tube 20 is hotter than end 20" and is heated by means of a heat source (not shown). Sufficient heat is transferred from the heat source through the heat tube 20 to elevate and maintain the temperature of the reactant stream to between 1000° C. and 1300° C. and convert reactants to products, for example 40 percent conversion or greater based on raw feed. The heat tubes employed are selected to provide best performance in the working temperature range required. The product stream is quenched in temperature in reactor zone 200 by means of the heat tube 22 where heat tube end 22' is cooler than tube end 22". Heat tube end 22' is in thermal contact with known cooling means which transfers heat from tube end 22" and the reaction products to bring their temperature to less than 500° C. A known ceramic coating on the heat tube 22 is provided which effectively suppresses decomposition of HCN in the product stream. The HCN is recovered from the product stream in the known manner.

Figure 4:
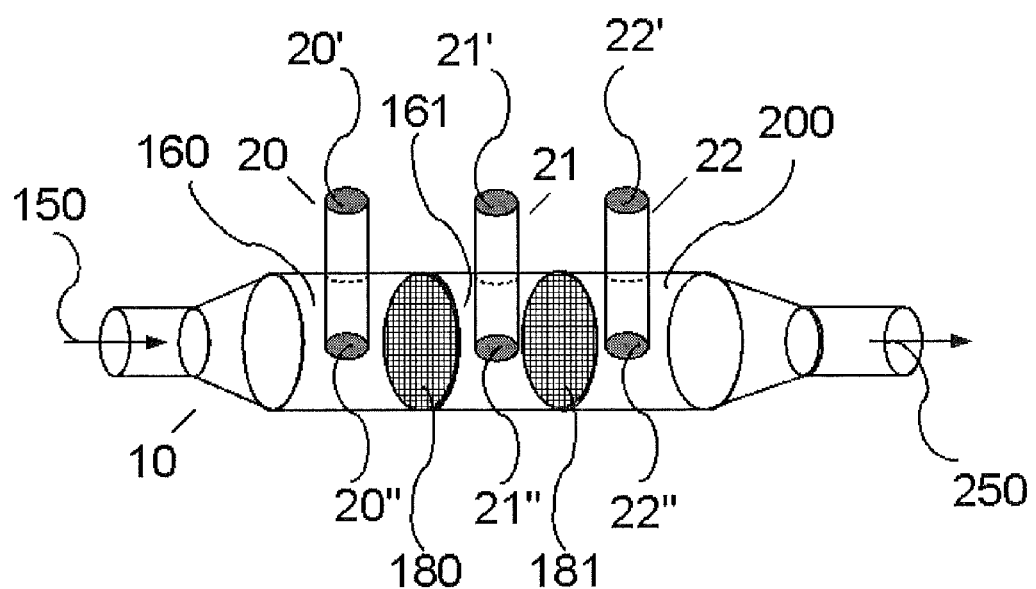
FIG. 4 is a representation of an apparatus provided with heat tubes, comprising repeating instances of a first stage reaction zone and a second stage reaction zone, and adapted for use in the processes disclosed herein.

Referring now to FIG. 4, the reactor 10 is provided with heat tubes (20, 22) adapted for use in a process of contacting, at atmospheric pressure or greater, the reactant stream 150 with a catalyst 180 to form a product stream 250 of HCN. Heat tube 20 is located in a first reaction zone 160 of reactor 10 where reactant stream 150, previously heated to a temperature between 800 and 1000° C., is brought into contact with a catalyst (0.1 to 20% by weight Pt group metal). Optionally as a means for preheating, a heat tube provided with a ceramic coating which substantially eliminates decomposition of ammonia and methane at the preheat temperature is provided. Most generally, the heat tube 20 has a catalyst disposed on at least a portion of the outer surface. The end 20' of heat tube 20 is hotter than end 20" and is heated by means of a heat source (not shown). Sufficient heat is transferred from the heat source through the heat tube 20 to elevate and maintain the temperature of the reactant stream to between 1000° C. and 1300° C. and convert reactants to products, for example 40 percent conversion or greater based on raw feed. The heat tubes employed are selected to provide best performance in the working temperature range required. The reactant stream is further directed to contact catalyst 180 of Pt/Rh (90% by weight Pt/10% by weight Rh) wire gauze through which greater than about 50 percent conversion to products takes place. Alternatively, the catalyst 180 may have other known forms, such as a foam, and may have other compositions known to effectively promote the formation of HCN, such as 85% by weight Pt/15% by weight Rh. The reactant stream is further directed to a second instance of the first reaction zone 160, depicted as reaction zone 161, provided with a second instance of the heat pipe 20, depicted as heat pipe 21, to further convert reactants to products, for example 80 percent conversion or greater. The reactant stream is then further directed to contact a second instance of catalyst 180, depicted as catalyst 181, through which greater than about 90 percent conversion to products takes place. The product stream is quenched in temperature in reactor zone 200 by means of the heat tube 22 where heat tube end 22' is cooler than tube end 22". Heat tube end 22' is in thermal contact with known cooling means which transfers heat from tube end 22" and the reaction products to bring their temperature to less than 500° C. A known ceramic coating on the heat tube 22 is provided which effectively suppresses decomposition of HCN in the product stream. The HCN is recovered from the product stream in the known manner.

Figure 5:
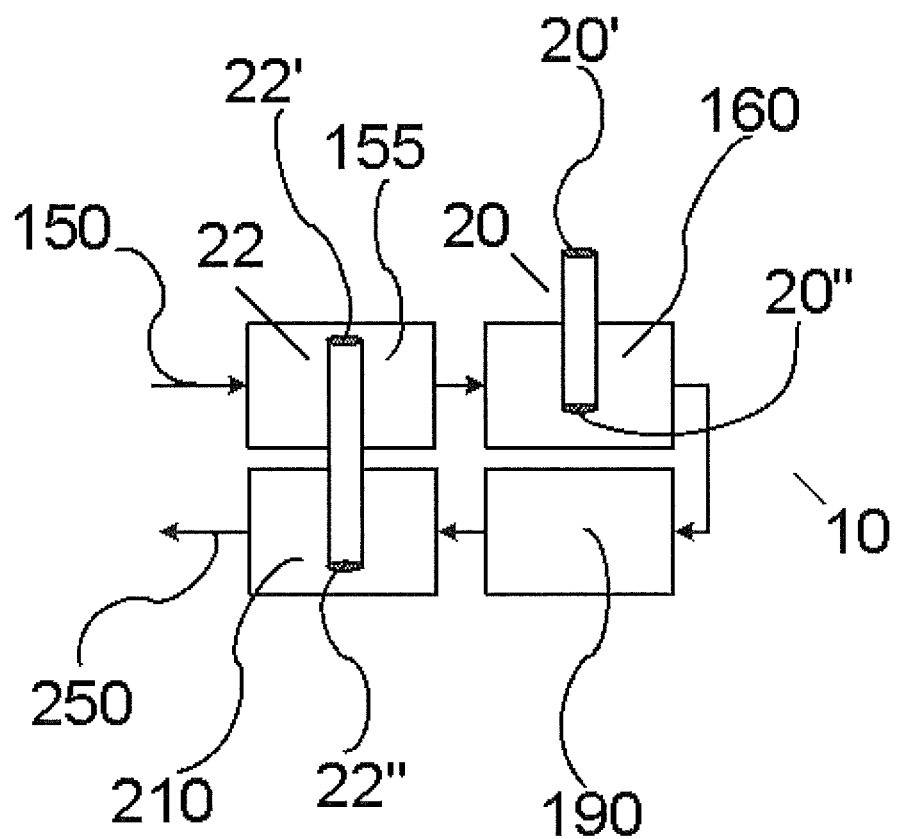
FIG. 5 is a representation of an apparatus provided with heat tubes and adapted for use in the processes disclosed herein, wherein heat tubes are used to convey thermal energy from a quench zone to a preheat zone.

Referring now to FIG. 5, the reactor 10 is provided with heat tubes (20, 22) adapted for use in a process of contacting, at atmospheric pressure or greater, the reactant stream 150 with a catalyst to form the product stream 250. The reactor 10 comprises four zones: a preheat zone 155, first reaction zone 160, second reaction zone 190, and quench zone 210. The preheat zone 155 and the first reaction zone 160, may be in direct contact or may be connected by a conduit such as a pipe or duct. The first reaction zone 160 and the second reaction zone 190 may be in direct contact or may be connected by a conduit such as a pipe or duct. The second reaction zone 190 and the quench zone 210 may be in direct contact or may be connected by a conduit such as a pipe or duct. Heat tube end 22' of the heat tube 22 is in thermal contact with the reaction stream 150 in the preheat zone 155 and provides a preheat temperature (800° C. to 1000° C.) to the reactant stream. The heat tube end 22' and the portion of the heat tube 22 that is within the preheat zone 155 is provided with a layer or ceramic coating which substantially eliminates decomposition of ammonia and methane at the preheat temperature is provided. The heat tube 20 is located in the first reaction zone 160 of the reactor 10 where the reactant stream 150, at the preheat temperature, is brought into contact with a catalyst (0.1 to 20% by weight Pt group metal). Most generally, the heat tube 20 has a catalyst disposed on at least a portion of the outer surface. The end 20' of heat tube 20 is hotter than end 20" and is heated by means of a heat source (not shown). Sufficient heat is transferred from the heat source through the heat tube 20 to elevate and maintain the temperature of the reactant stream to between 1000° C. and 1300° C. and convert reactants to products, for example 40 percent conversion or greater based on raw feed. The heat tubes employed are selected to provide best performance in the working temperature range required. The product stream is quenched in temperature in quench zone 210 by means of the heat tube 22 where heat tube end 22' is cooler than tube end 22". Heat tube end 22' is in thermal contact with the reaction stream 150 in the preheat zone 155 and heat tube end 22" is in thermal contact with product stream 250 in the quench zone 210 such that at the least one heat tube 22 transfers heat from the product stream 250 to the reactant stream 150, to bring the reaction products to a temperature to less than 500° C. A known ceramic coating is provided on the heat tube end 22" and the portion of the heat tube 22 that is within the quench zone 210, and effectively suppresses decomposition of HCN in the product stream. The HCN is recovered from the product stream in the known manner.

Figure 6:
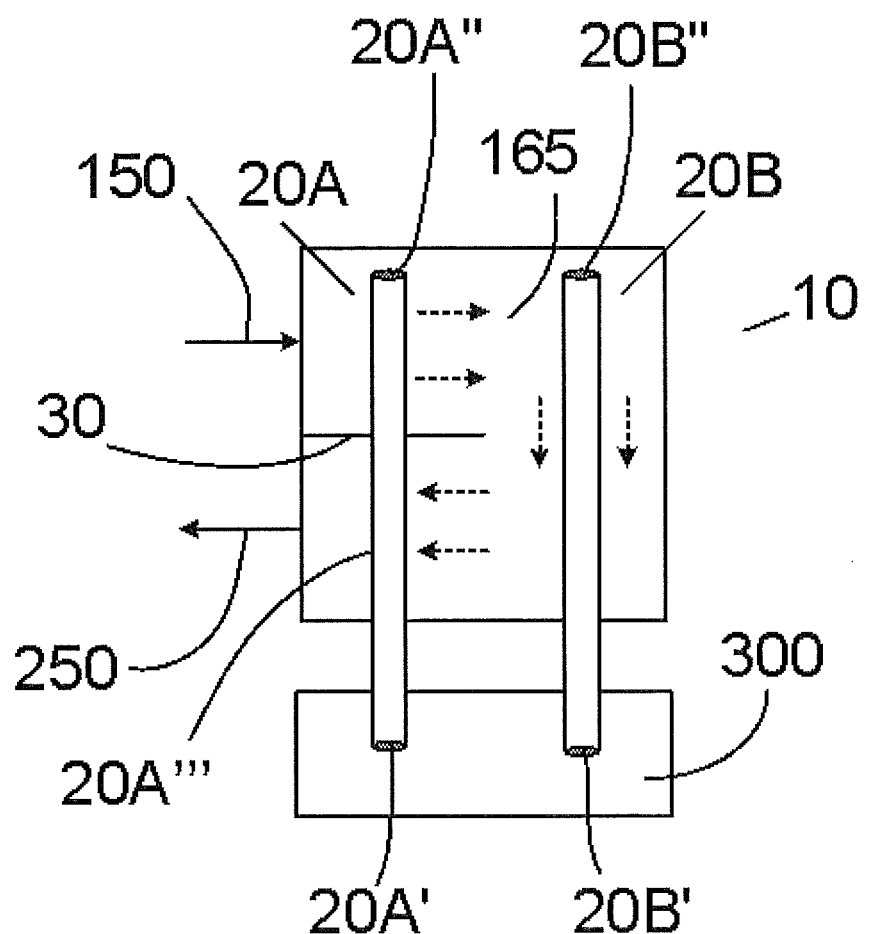
FIG. 6 is a representation of an apparatus provided with heat tubes and adapted for use in the processes disclosed herein, wherein heat tubes are oriented to provide both cross-flow and axial-flow.

Heat tubes located in a reactor zone may be oriented in various ways in relation to the direction of flow of the reactants and products in that zone. Reactor zones may be provided with baffles to direct the flow of reactants and products within the zone. Referring now to FIG. 6, the reactor 10 is provided with heat tubes (20A, 20B) adapted for use in a process of contacting, at atmospheric pressure or greater, the reactant stream 150 with a catalyst to form the product stream 250. The reactor 10 comprises a reaction zone 165 containing a baffle 30. The reactant stream enters the reaction zone 165 on one side of the baffle 30 and the product stream leaves the reaction zone 165 on the other side of the baffle 30. Heat tube 20A is in thermal contact with the reaction zone 165 of the reactor 10 where the reactant stream 150, at the preheat temperature, is brought into contact with a catalyst (0.1 to 20% by weight Pt group metal). The heat tube 20A is positioned in a direction normal to the baffle 30 and extends through the baffle 30 such that end 20A" is in thermal contact with the reactant stream 150, a middle portion 20A''' is in thermal contact with the product stream 250 and end 20A' is in thermal contact with a known heat source 300. The end 20A' of the heat pipe 20A is hotter than end 20A" and is effective to transfer heat to the reactant stream in the reaction zone 165. The orientation of the heat tube 20A further provides for a substantially cross-flow (in relation to the heat tube 20A) of reactants and products in thermal contact with the heat tube 20A in the reaction zone 165. Heat tube 20B is positioned in a direction normal to the baffle 30 in a region of reaction zone 165 not divided by the baffle 30 such that end 20B" of the heat pipe 20B is in thermal contact with the reaction zone 165 and end 20B' is in thermal contact with the known heat source 300. The end 20B' of the heat tube 20B is hotter than end 20B" and is effective to transfer heat to the reaction zone 165. The orientation of the heat tube 20B further provides for a substantially axial-flow (in relation to the heat tube 20B) of reactants and products in thermal contact with the heat tube 20B in the reaction zone 165. Additionally, the heat tube 20A and the heat tube 20B may be oriented vertically such that the end 20A' is below the end 20A" and the end 20B' is below the end 20B" so that the heat tube 20A and the heat tube 20B operate as gravity-assisted heat tubes. Most generally, the heat tube 20A and the heat tube 20B are coated with a catalyst disposed on at least a portion of the outer surface. Sufficient heat is transferred from the heat source through the heat tubes 20A and 20B to elevate and maintain the temperature of the reactant stream to between 1000° C. and 1300° C. and convert reactants to products, for example 40 percent conversion or greater based on raw feed. The heat tubes employed are selected to provide best performance in the working temperature range required. The product stream is quenched in temperature by means described previously. The HCN is recovered from the product stream in the known manner.

Figure 7:
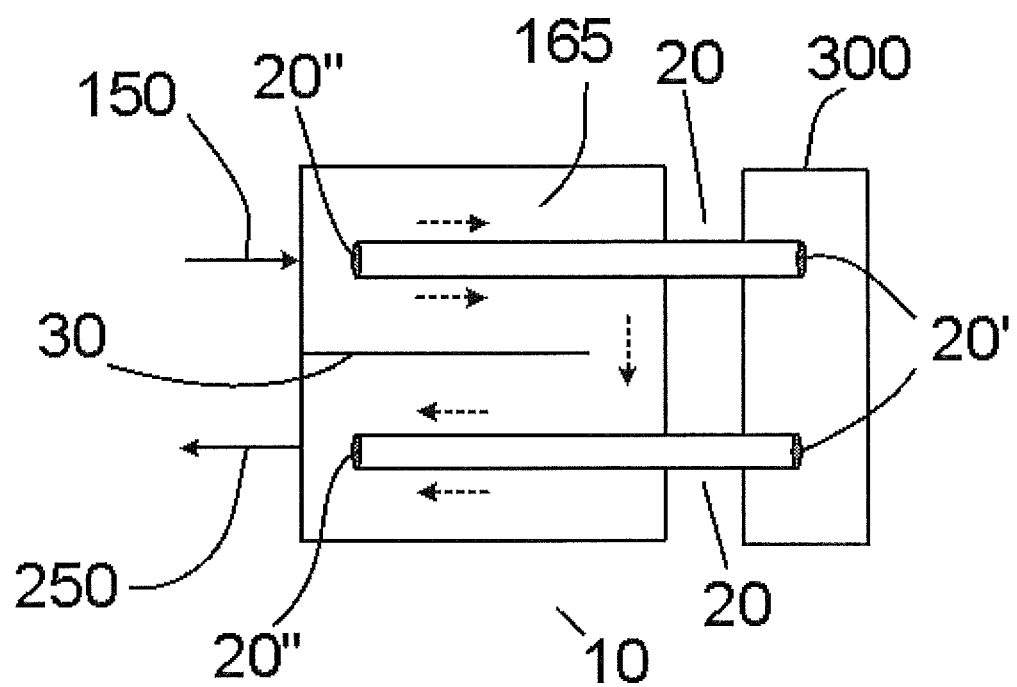
FIG. 7 is a representation of an apparatus provided with heat tubes and adapted for use in the processes disclosed herein, wherein heat tubes are oriented to provide substantially axial-flow.

Referring now to FIG. 7, the reactor 10 is provided with a heat tubes (20) adapted for use in a process of contacting, at atmospheric pressure or greater, the reactant stream 150 with a catalyst to form the product stream 250. The reactor 10 comprises a reaction zone 165 containing a baffle 30. The reactant stream enters the reaction zone 165 on one side of the baffle 30 and the product stream leaves the reaction zone 165 on the other side of the baffle 30. Heat tube 20 is in thermal contact with the reaction zone 165 of the reactor 10 where the reactant stream 150, at the preheat temperature, is brought into contact with a catalyst (0.1 to 20% by weight Pt group metal). The heat tube 20 is positioned in a direction parallel to the baffle 30 such that end 20" is in thermal contact with the reactant stream 150 and end 20' is in thermal contact with a known heat source 300. The end 20' of the heat pipe 20 is hotter than end 20" and is effective to transfer heat to the reaction zone 165. The orientation of the heat tube 20A further provides for a substantially axial-flow (in relation to the heat tube 20) of reactants and products in thermal contact with the heat tube 20 in the reaction zone 165. Additionally, the heat tube 20 may be oriented vertically such that the end 20' is below the end 20" so that the heat tube 20A operates as a gravity-assisted heat tube. Most generally, the heat tube 20 has a catalyst disposed on at least a portion of the outer surface. Sufficient heat is transferred from the heat source through the heat tube 20 to which elevate and maintain the temperature of the reactant stream to between 1000° C. and 1300° C. and convert reactants to products, for example 40 percent conversion or greater based on raw feed. The heat tubes employed are selected to provide best performance in the working temperature range required. The product stream is quenched in temperature by means described previously. The HCN is recovered from the product stream in the known manner.

Figure 8:
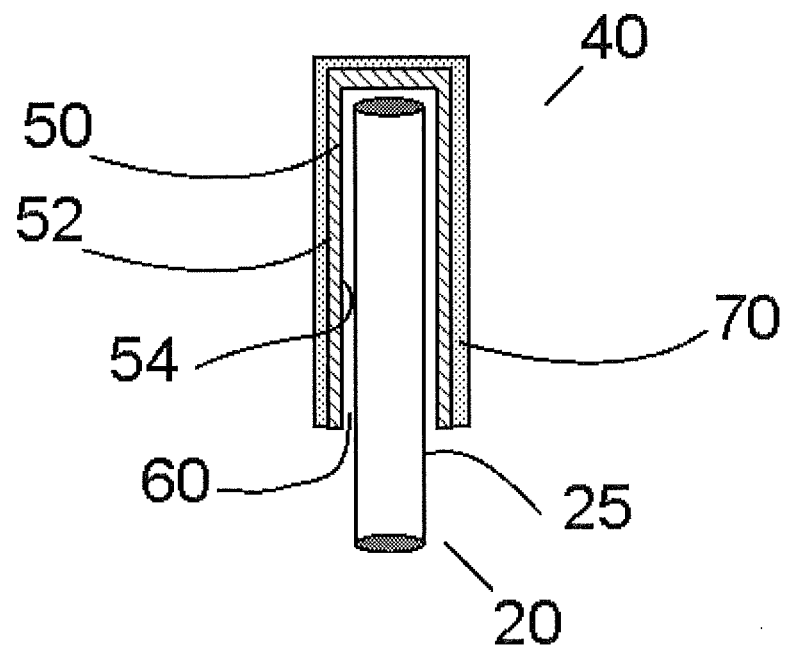
FIG. 8 is a representation of a sheathed heat tube for use in an apparatus adapted for use in the processes disclosed herein.

A ceramic sheath (e.g., sleeve) may be used to cover at least a portion of a heat tube in thermal contact with the reactants and products in a reactor zone, such as the preheat zone, reaction zone, or quench zone. Referring now to FIG. 8, a heat pipe assembly 40 is comprised of a heat tube 20, inserted into a ceramic sheath 50, having an exterior surface 52, and having an annular gap 60 between an inner surface 54 of the ceramic sheath 50 and an outer surface 25 of the heat tube 20. The annular gap 60 is of sufficient width to allow for relative difference in thermal expansion between the heat tube 20 and the ceramic sheath 50 at the contemplated operating temperature without being so large that it significantly reduces heat transfer efficiency. An external layer 70 of one or more known materials may surround the ceramic sheath 50, substantially adjacent to the exterior surface 52. The exterior surface 52 of ceramic sheath 50, and therefore of the external layer 70, may be rough, ridged, cog-toothed, etched, finned or have any known shape that enhances surface. The external layer 70 may be any known form, such as, but not limited to wire gauze, foil, foam, impregnated coatings, wash coatings, or any combination thereof. The one or more known materials in the external layer 70 may be chosen to provide one or more desired results. For example, in a preheat zone, the layer may be chosen to substantially eliminate decomposition of ammonia and methane at the preheat temperature of the reactant stream 150. In a reaction zone, the layer may be chosen to catalytically promote conversion of reactants to products. In a quench zone the layer may be chosen to effectively suppress decomposition of HCN in the product stream 250.

Figure 9:
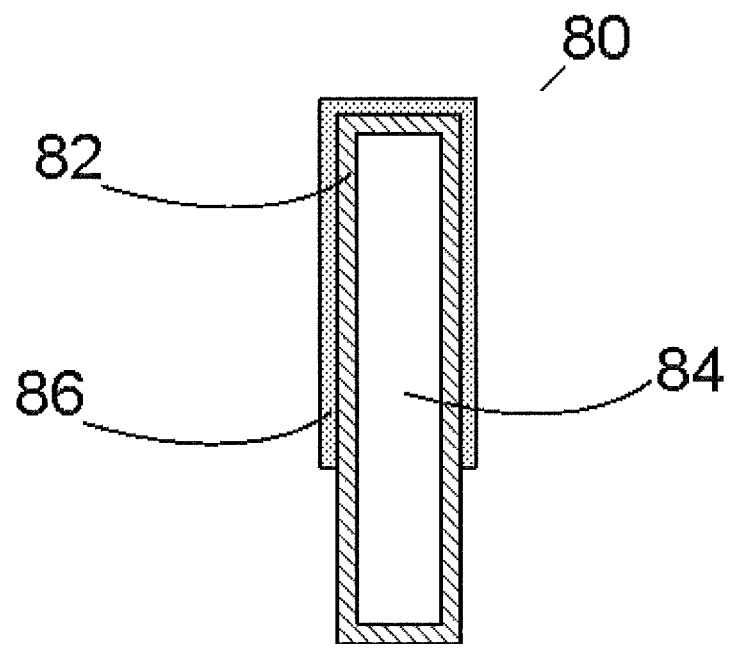
FIG. 9 is a representation of a heat tube for use in an apparatus adapted for use in the processes disclosed herein.

Referring now to FIG. 9, a heat pipe 80 is at least partially disposed in a reactor interior (not shown) and comprises an envelope 82 having an interior 84, said heat pipe interior 84 containing a working fluid (not shown). A layer 86 is disposed around at least a portion of the outer surface of the heat pipe envelope 82. The layer 86 may be chosen to substantially eliminate decomposition of ammonia and methane at the preheat temperature of the reactant stream 150, to catalytically promote conversion of reactants to products, to effectively suppress decomposition of HCN in the product stream 250, or to effectively decompose at least a portion of any unreacted ammonia in the product stream 250.

EXAMPLE

Figure 10:
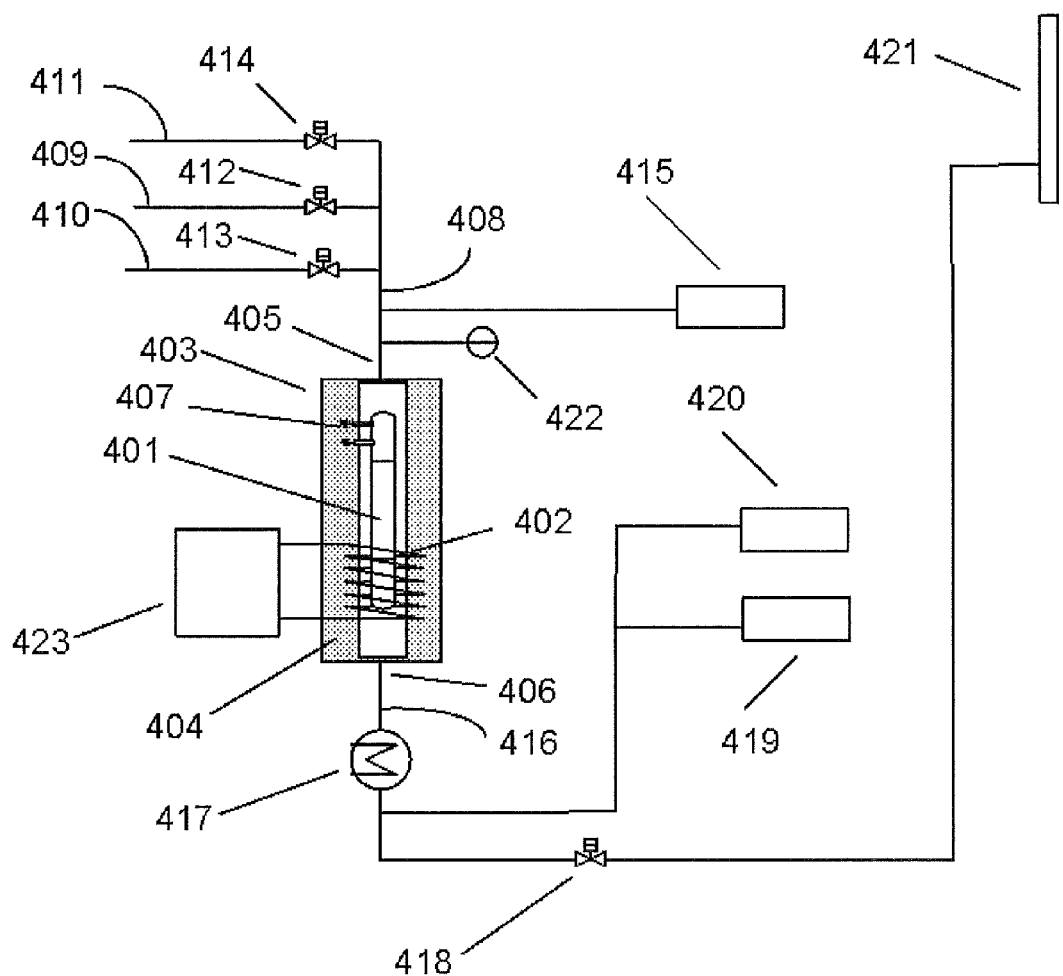
FIG. 10 is a representation of an apparatus in accordance with the present invention.

In a prophetic example, the process of the invention is demonstrated as follows. Referring now to FIG. 10, a high temperature heat pipe 401 comprised of an envelope formed from an appropriate high temperature metallurgy such as Inconel 600, with an internal vapor space containing a high temperature working fluid such as sodium is produced by methods known in the art (e.g., "Design and Technology of Heat Pipes for Cooling and Heat Exchange", Calvin C. Silverstein, 1992, Taylor and Francis). The heat pipe 401 is coated with platinum using an electroplating technique. An energy source and reaction vessel is prepared by placing an induction coil 402 into an appropriately sized vessel 403 then forming a ceramic lining 404 using a castable ceramic material, Kao-Tab 95 high-alumina castable, available from Thermal Ceramics Incorporated of Augusta, Ga. The casting is formed such that the heat pipe 401, placed entirely within the reactor vessel, is supported by the castable ceramic lining and is axially aligned with reactor vessel and induction coil 402 such that the induction coil 402 surrounds a portion of one end of the heat pipe 401. An annular gap is provided between the castable ceramic lining 404 and the heat pipe 401 thus forming a reaction zone. A feed gas inlet 405 and a product gas outlet 406 are provided such that gas is fed to an inlet end of the reactor, passes through the annular gap, and is discharged from an exit end of the reactor. The reactor contains one or more thermocouples 407 to monitor the temperature of the heat pipe 401.

A feed pipe 408 is used to supply the feed gas to the reactor. Methane 409, ammonia 410, and nitrogen 411 are metered into the feed pipe using mass flow controllers 412, 413, and 414, respectively, in order to establish the desired flow and composition of the feed gas. The composition of the feed gas is confirmed using a fourier transform infrared (FTIR) feed analyzer 415 or feed gas chromatograph (GC) analyzer (not shown). A discharge pipe 416 is used to remove product gas from the reactor. The discharge pipe 416 contains a product cooler 417 to cool the product gas to a desired temperature. The discharge pipe 416 contains a back pressure control valve 418 to control the pressure within the reaction zone. The composition of the product gas is measured using product FTIR 419 or product GC analyzer 420. The discharge pipe 416 is connected to a flare 421 wherein the product gas is combusted.

The temperature of the heat pipe 401 is raised to a desired temperature from about 900 to about 1300 C, and controlled at that temperature by monitoring the one or more thermocouples 407 within the reaction zone while modulating the power input to the induction coil 402 from an induction power supply 423 (available from Ameritherm Incorporated of Scottsville, N.Y.) using known methods and equipment.

The pressure within the reaction zone is measured by pressure transmitter 422 and controlled by modulating the control valve 418 such that the reaction zone pressure is approximately equal to the pressure of the working fluid within the heat pipe envelope, thus greatly reducing the stress on the envelope. The reduction in stress thereby enables the use of lower cost envelope materials and working fluids at higher temperatures and with longer life expectancy.

It is anticipated that such a reactor system is capable of producing HCN from methane and ammonia.

While the foregoing example indicates sodium as a working fluid, it should be noted that similar results and performance could be obtained while utilizing cesium, potassium, or lithium as the working fluid so long as the process operating pressure and working fluid pressure are approximately equal, thus greatly reducing the stress on the envelope.

The foregoing disclosure constitutes a description of specific embodiments illustrating how the invention may be used and applied. Such embodiments are only exemplary. The invention in its broadest aspects is further defined in the claims which follow. These claims and terms used therein are to be taken as variants of the invention described. These claims are not restricted to such variants but are to be read as covering the full scope of the invention implicit within the disclosure herein.

What is claimed:

1. A process for endothermic chemical synthesis of HCN comprising:
   (a) providing a reactor having an interior and a preheat zone for elevating the temperature of a feed gas to a first temperature, wherein said feed gas comprises at least one reactant, and wherein said preheat zone comprises a first heat pipe coated to inhibit the decomposition of said feed gas;
   (b) providing a reaction zone containing a second heat pipe partially disposed in said reactor interior and coated with a first catalyst;
   (c) flowing the preheated feed gas of step (a) to said reaction zone of step (b) and heating said preheated feed gas by contacting said preheated feed gas with the second heat pipe coated with the first catalyst;
   (d) endothermically reacting the at least one reactant in said reaction zone to form at least one product at a temperature above about 1000° C.;
   (e) withdrawing the at least one product comprising HCN from said reaction zone; and
   (f) flowing said withdrawn product to a quench zone comprising a third heat pipe for cooling said at least one product, wherein said third heat pipe comprises a coating for inhibiting decomposition of said at least one product;
   wherein the reactor pressure is at least 80 psia.

2. The process of claim 1 wherein one or more of the second and third coated heat pipes comprises an envelope having an interior, said heat pipe interior containing the working fluid, wherein said working fluid has a vapor pressure; and wherein the absolute pressure difference between a reactor pressure and said vapor pressure is sufficiently low to obtain stable heat pipe operating characteristics at said reactor temperature.

3. The process of claim 1 wherein said at least one reactant comprises ammonia and methane.

4. The process of claim 2 further comprising means to control said reactor pressure at a predetermined value.

5. The process of claim 2 wherein said working fluid comprises sodium.

6. The process of claim 2 wherein said pressure difference is less than about 1 atmosphere.

7. The process of claim 2 wherein said pressure difference is less than about 5 psi.

8. The process of claim 2 wherein said pressure difference is less than about 1 psi.

9. The process of claim 2 wherein said envelope comprises stainless steel or a stainless steel alloy.

10. The process of claim 1 wherein said reactor temperature is greater than about 1200° C.

11. The process of claim 2 further comprising means to control pressure of that portion of the envelope of said second heat pipe which is not disposed within said reactor.

12. The process of claim 1 wherein said first catalyst is disposed on at least a portion of an outer surface of said second heat pipe.

13. The process of claim 1 further comprising a ceramic sheath disposed around said second heat pipe, wherein said first catalyst is disposed on at least a portion of an outer surface of said ceramic sheath.

14. The process of claim 1 wherein said reactants flow substantially parallel to the longitudinal axis of said second heat pipe.

15. The process of claim 1 wherein said first heat pipe is partially disposed in said reactor interior, and wherein said reactants flow substantially parallel to the longitudinal axis of said first heat pipe.

16. The process of claim 1, further comprising reducing the stress on the at least one heat pipe by reducing the absolute value of the differential between the reactor pressure and the pressure of the at least one heat pipe internal pressure.

17. A process for endothermic chemical synthesis of HCN comprising:
(a) providing a reactor having an interior and a preheat zone for elevating the temperature of a feed gas to a first temperature, wherein said feed gas comprises at least one reactant, and wherein said preheat zone comprises a first heat pipe coated to inhibit the decomposition of said feed gas;
(b) providing a reaction zone containing a second heat pipe partially disposed in said reactor interior and coated with a first catalyst;
(c) flowing the preheated feed gas of step (a) to said reaction zone of step (b) and heating said preheated feed gas by contacting said preheated feed gas with the second heat pipe coated with the first catalyst;
(d) endothermically reacting the at least one reactant in said reaction zone to form at least one product at a temperature above about 1000° C.;
(e) withdrawing the at least one product comprising HCN from said reaction zone; and
flowing said withdrawn product to a quench zone comprising a third heat pipe for cooling said at least one product, wherein said third heat pipe comprises a coating for inhibiting decomposition of said at least one product; and
wherein said at least one heat pipe comprises an envelope having an interior, said at least one heat pipe interior containing a sodium working fluid, wherein said working fluid has a vapor pressure; and wherein the reactor pressure on the exterior of the heat pipe (Po, measured in psia) when calculated as a function of the heat pipe working fluid temperature (T, measured in ° C.) satisfies the following equation:

$Po = a_{Na}T^3 - b_{Na}T^2 + c_{Na}T - d_{Na}$ wherein:
Po is in psia,
T is in the range of 1000 to 1300° C.,
$a_{Na}$ is equal to $1.2 \times 10^{-6}$,
$b_{Na}$ is equal to $2.7405 \times 10^{-3}$,
$c_{Na}$ is equal to 2.1643, and
$d_{Na}$ is in the range of 570 to 600.
and wherein varying the value of $d_{Na}$ from 570 to 600 defines an operating pressure band between the upper and lower limits of Po.

* * * * *